United States Patent
Kondo et al.

(10) Patent No.: US 6,584,265 B2
(45) Date of Patent: Jun. 24, 2003

(54) OPTICAL WAVEGUIDE ELEMENT HAVING A SINGLE CRYSTALLINE SUBSTRATE WITH A CRYSTAL AXIS ANGLED WITH RESPECT TO A SURFACE OF THE SUBSTRATE

(75) Inventors: Atsuo Kondo, Nagoya (JP); Jungo Kondo, Nagoya (JP); Yoshinari Kozuka, Nagoya (JP); Soichiro Matsuzawa, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/916,124

(22) Filed: Jul. 25, 2001

(65) Prior Publication Data
US 2002/0048442 A1 Apr. 25, 2002

(30) Foreign Application Priority Data
Jul. 27, 2000 (JP) ........................... 2000-226396

(51) Int. Cl.[7] ................................. G02B 6/10
(52) U.S. Cl. ................. 385/129; 385/130; 385/131; 385/132
(58) Field of Search ................... 385/129–132

(56) References Cited
U.S. PATENT DOCUMENTS

| | | | | |
|---|---|---|---|---|
| 4,884,277 A | * | 11/1989 | Anthon et al. | 372/21 |
| 4,953,931 A | * | 9/1990 | Miyazaki et al. | 359/328 |
| 5,227,011 A | * | 7/1993 | Enomoto et al. | 216/66 |
| 5,295,218 A | * | 3/1994 | Agostinelli et al. | 359/326 |
| 5,303,315 A | * | 4/1994 | Granestrand | 385/16 |
| 5,347,157 A | * | 9/1994 | Hung et al. | 257/12 |
| 5,393,371 A | * | 2/1995 | Chang et al. | 216/24 |
| 5,519,802 A | * | 5/1996 | Field et al. | 359/241 |
| 5,561,549 A | * | 10/1996 | Hatori et al. | 359/249 |

OTHER PUBLICATIONS

K. Mizuuchi et al., "Harmonic Blue Light Generation in X–cut MgO:LiNBO$_3$ Waveguide," Electronic Letters, Apr. 24, 1997, vol. 33, No. 9, pp 806–807.

Kazuo Eda, et al., "Direct Bonding of Piezoelectric Materials," The Institute of Electronics, Information and Communication Engineers, Technical Report of IEICE, US95–24, EMD95–20, CPM95–32 (Jul. 1995), pp. 31–38.

Patent Abstracts of Japan, vol. 014, No. 150 (P–1025), Mar. 22, 1990 & JP 02 012135 A (Ibiden Co., Ltd.), 17 March 190 *abstract*.

* cited by examiner

Primary Examiner—John D. Lee
Assistant Examiner—Daniel Petkovsek
(74) Attorney, Agent, or Firm—Burr & Brown (57) ABSTRACT

An optical waveguide element includes a substrate made of a lithium tantalate single crystal or a lithium niobate-lithium tantalate solid solution single crystal and a bulky optical waveguide made of a lithium niobate single crystal is directly joined to the substrate. The c-axis of the single crystal substrate is tilted at an angle with respect to the surface of the substrate to which the bulky optical waveguide is joined. The tilted angle is preferably within a range of 17–37 degrees.

10 Claims, 8 Drawing Sheets

OPTICAL WAVEGUIDE ELEMENT HAVING A SINGLE CRYSTALLINE SUBSTRATE WITH A CRYSTAL AXIS ANGLED WITH RESPECT TO A SURFACE OF THE SUBSTRATE

BACKGROUND OF THE INVENTION

1. Field of the Invention

This invention relates to an optical waveguide element suitable for a second harmonic wave-generating element using e.g., a quasi-phase-matching.

2. Related Art Statement

For achieving a high density optical recording in an optical information processing technique, a blue laser to generate and oscillate a blue light of a 400 nm–430 nm wavelength at an output of 30 mW or more is desired, and thus, has been intensely researched and developed As a blue optical resource, an optical waveguide-type wavelength converting element, in which a laser to oscillate a red light as a fundamental wave and a second harmonic wave-generating element using a quasi-phase-matching are combined, has been expected.

For example, in "Electronics Letters, Apr. 24, 1997, Vol. 33, No.9", pp806–807, it is described that a periodically polarized inversion structure is formed in a MgO-doped lithium niobate substrate, and an optical waveguide is formed perpendicularly to the periodically polarized structure by a proton-exchanging method to thereby fabricate an optical waveguide-type second harmonic wave-generating device.

Moreover, in "TECHNICAL REPORT OF IEICE US95-24:EMD95-20:CPM95-32 (1995-07), pp31–38, it is described that a lithium niobate substrate is directly joined with a lithium tantalate substrate, and is ground and polished to be thinner to thereby fabricate a bulky optical waveguide from the thinned lithium niobate substrate. In this case, the surfaces of the lithium niobate substrate and the lithium tantalate substrate to be joined are flattened and cleaned, and hydrophilized. Then, hydroxyl-groups are absorbed on the surfaces of the substrates, and thermally treated to join the substrates. The hydroxyl-groups and hydrogen elements are desorbed gradually from the joined surfaces of the substrates, and thus, the substrates are strongly joined with each other to fabricate an optical waveguide device capable of confining a given optical wave. Furthermore, it is proposed that thus obtained optical waveguide device can be used for an optical waveguide device having a large optical damage-resistance, a large SHG effect, and an optical integrated circuit.

However, in the optical waveguide device shown in the above "TECHNICAL REPORT OF IEICE", the d constant (opto-electric constant) is likely to be degraded due to the difference in thermal expansion between the substrates. Therefore, a second harmonic wave-generating element having a periodically polarized conversion structure formed in the optical waveguide has only poor converting efficiency to a second harmonic wave. Particularly, the lithium niobate substrate and the lithium tantalate substrate are required to be directly joined at 100–1000° C., more particularly 300° C. or more. Therefore, the optical waveguide made of the thinned lithium niobate substrate is deformed due to the difference in thermal expansion between the substrates during the cooling down step after the joining step, resulting in the deterioration of the d constant and, in extreme cases, the mode change of the optical wave to be propagated. As a result, an optical waveguide device for practical use has not yet been provided.

SUMMARY OF THE INVENTION

It is an object of the present invention to prevent the deterioration of the d constant in such an optical waveguide element as mentioned above, which is made of a substrate and a bulky optical waveguide, while maintaining large optical damage-resistance characteristics.

For achieving the above object, this invention relates to an optical waveguide element including a substrate made of a lithium tantalate single crystal or a lithium niobate-lithium tantalate solid solution single crystal and a bulky optical waveguide made of a lithium niobate single crystal directly joined to the substrate. The c-axis of the single crystal constituting the substrate is tilted with respect to the surface of the substrate to be joined.

According to the present invention, the offset substrate and the bulky optical waveguide made of the lithium niobate single crystal are employed. Moreover, the offset substrate and the bulky optical waveguide are directly joined. Therefore, the bulky optical waveguide can keep the good crystallinity, and thus, the optical waveguide element can have lower optical propagation-loss. At the same time, the thermal expansions of the offset substrate and the bulky optical waveguide can be matched two-dimensionally in the whole range of the joined surface thereof. As a result, the d constant of the thus obtained optical waveguide element according to the present invention can be developed while maintaining the lower optical damage-resistance.

Particularly, a second harmonic wave-generating device for practical use, having a lower optical damage in the optical waveguide and a stable d constant, is fabricated using the above-mentioned optical waveguide element. Therefore, the present invention can greatly contribute to industrial applications.

In the case of fabricating a higher harmonic wave-generating device, particularly a second harmonic wave-generating device, a higher harmonic wave of 330–550 mm, particularly 400–430 nm can be obtained.

BRIEF DESCRIPTION OF THE DRAWINGS

For a better understanding of this invention, reference is made to the attached drawings, wherein.

DETAILED DESCRIPTION OF THE INVENTION

Figure 1A:
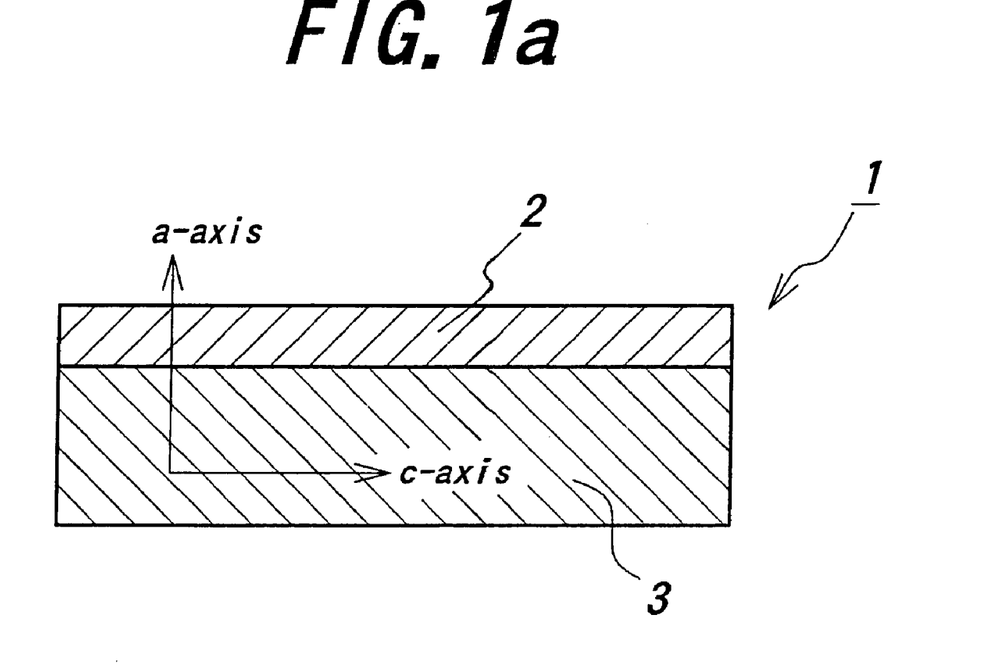
FIG. 1(a) is a cross sectional view showing a member 1 made of a lithium niobate single crystal.

This invention is described in detail hereinafter, with reference to the attached drawings. FIG. 1(a) is a cross sectional view showing a member 1 made of a lithium niobate single crystal. The member 1 is made of a X-cut plate 3 of lithium niobate single crystal and a periodically polarized inversion structure 2 formed on a main surface of the X-cut plate 3. The X-cut plate of lithium niobate single crystal has an "a-axis (X-axis)" almost perpendicular to the main surface thereof. In this point of time, the periodically polarized inversion structure 2 dose not function as an optical waveguide. Generally; a lithium niobate single crystal, a lithium niobate-lithium tantalate solid solution single crystal and a lithium tantalate single crystal have their respective two orthogonal a-axes and c-axes orthogonal to each of the a-axes. The periodically polarized inversion structure can be made by e.g., a voltage applying method.

The lithium niobate single crystal to be used in this invention may incorporate another doped metallic element. For example, at least one element selected from the group consisting of Mg, Zn, Sc and In may be doped in the lithium niobate single crystal.

The amount of the above doped element is preferably set to 10 mol % or below, particularly 5 mol % or below, in order to keep the crystalline properties of the lithium niobate single crystal. Moreover, in view of the optical damage-resistance of the optical waveguide to be made of the lithium niobate single crystal, the doped amount is preferably set to 1 mol % or over.

Figure 1B:
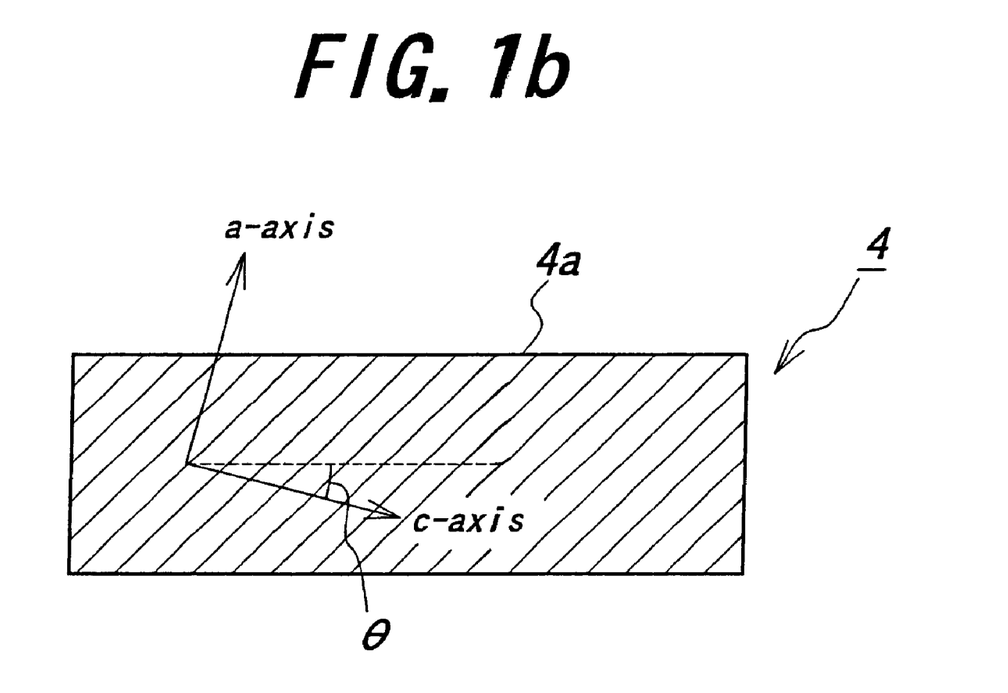
FIG. 1(b) is a cross sectional view showing a substrate 4 made of a lithium niobate single crystal or a lithium niobate-lithium tantalate solid solution single crystal.

FIG. 1(b) is a cross sectional view showing a substrate 4 made of a lithium tantalate single crystal. The c-axis is tilted from a main surface (joining surface) 4a of the substrate 4 by an angle of θ.

Figure 2:
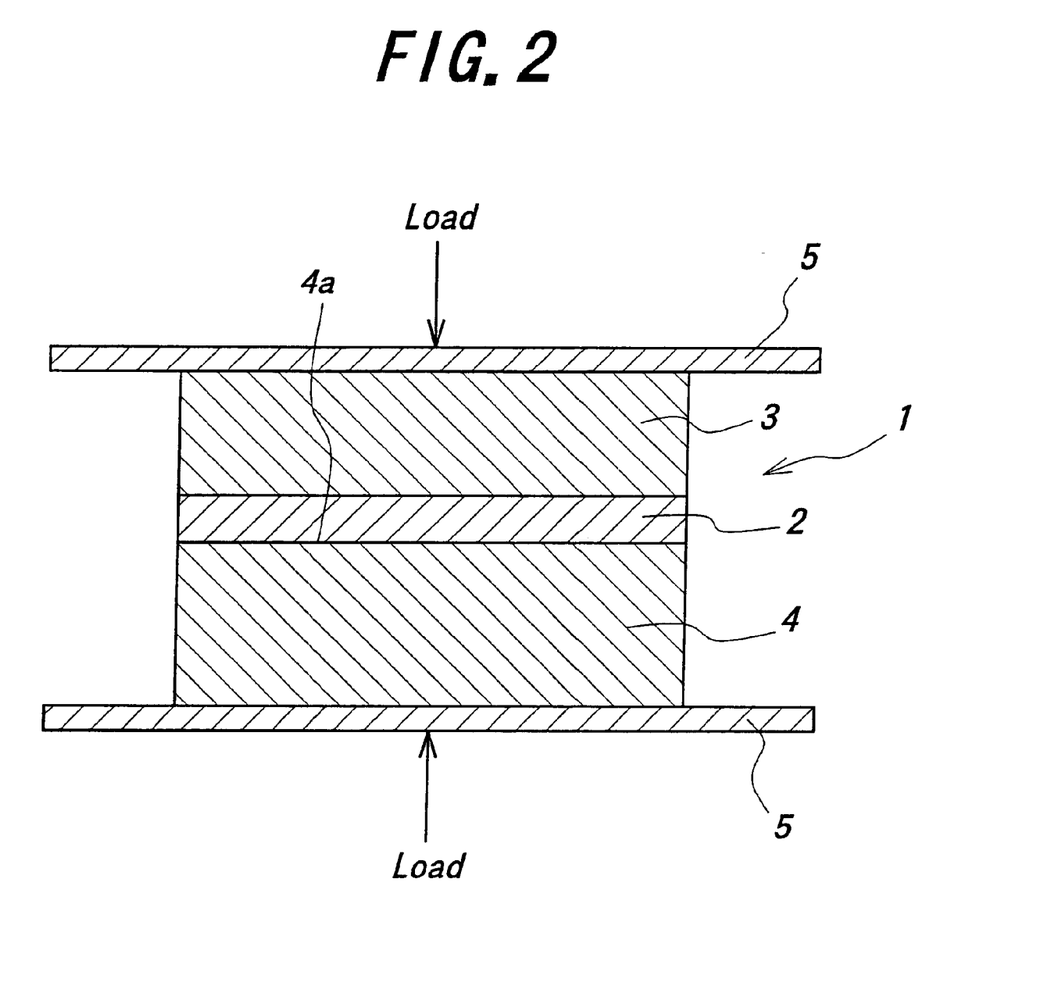
FIG. 2 is a schematic view showing the direct joining step for the member 1 and the substrate 4 laminated under a given load being applied.

Then, as shown FIG. 2(a), the member 1 and the substrate 4 are laminated and directly joined. The meaning of the "direct joining" is to directly contact and join the member 1 (to construct an optical waveguide) and the substrate 4 without another adhesive layer or joining layer. The member 1 and the substrate 4 are joined via a joining force generated at the boundary between the member 1 and the substrate 4.

The concrete joining technique is disclosed in the above-mentioned "TECHNICAL REPORT OF IEICE". In this invention, the member 1 and the substrate are preferably joined by the following condition.

First of all, the surfaces of the member 1 and the substrate 4 to be joined are precisely polished and flattened preferably up to the surface roughness Ra being set to 5 Å or below and the waviness Wa being set to 1 μm or below. Then, the surfaces are cleaned and hydrophilized by preferably using moisture. The member 1 and the substrate 4 are laminated so that the surfaces to be joined are opposed under a load of 0.5–10 kg/cm² being applied, and are thermally treated at 400–600° C.

Figure 3A:
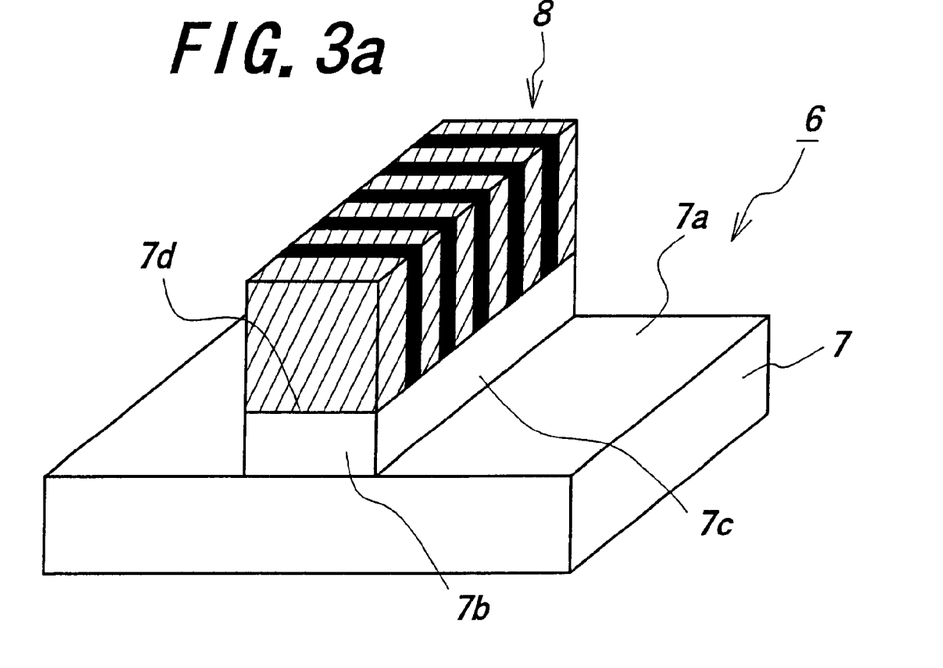
FIG. 3(a) is a perspective view schematically showing an optical waveguide element 6.
Figure 3B:
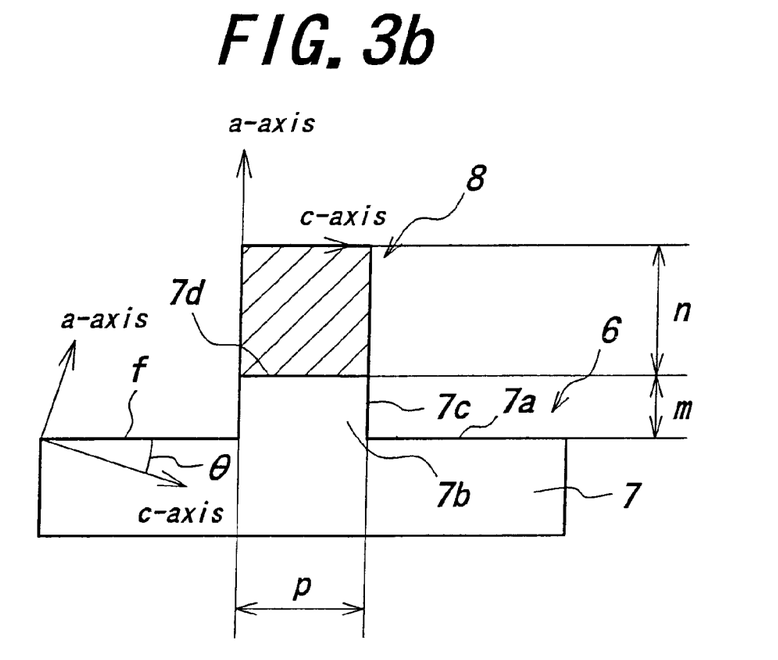
FIG. 3(b) is an elevational view showing the optical waveguide element 6.
Figure 4A:
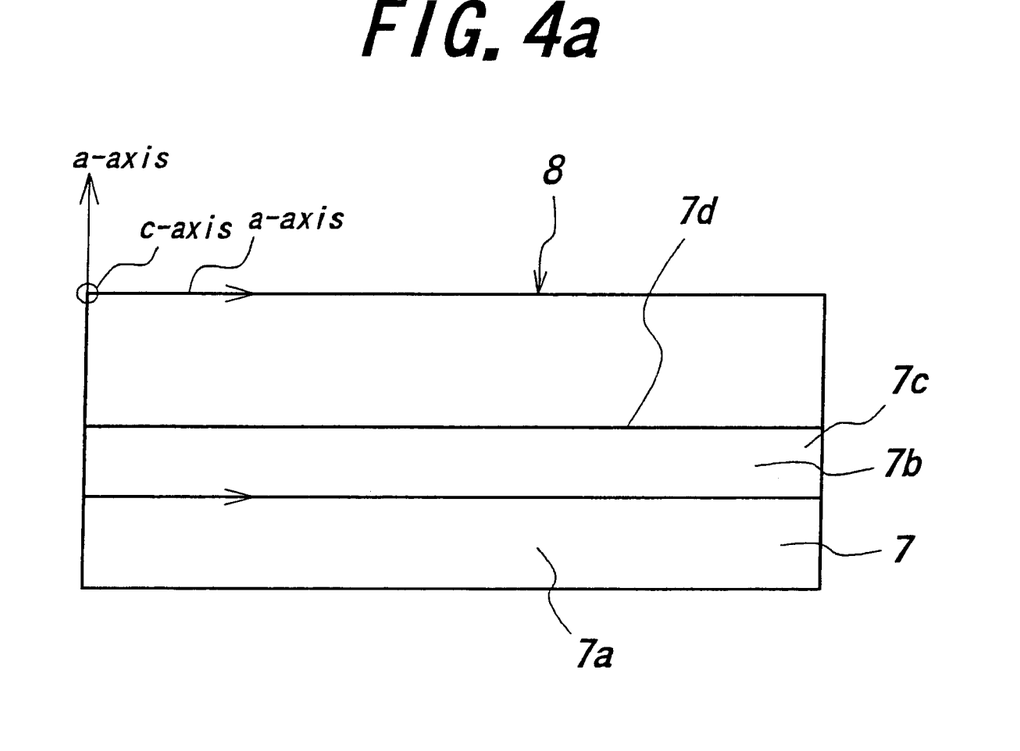
FIG. 4(a) is a side view showing the optical waveguide element 6.
Figure 4B:
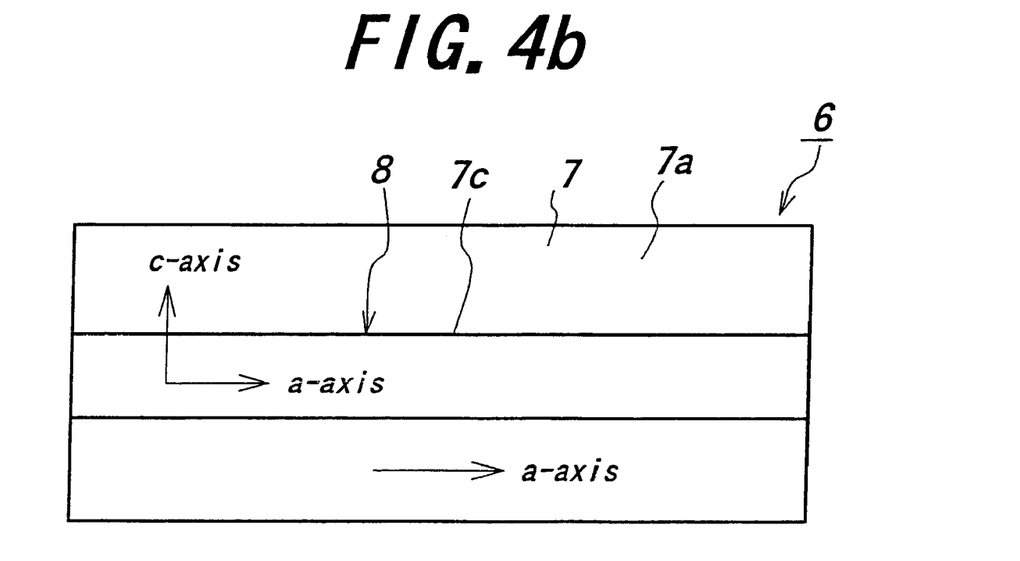
FIG. 4(b) is a plan view showing the optical waveguide element 6.

After the joint between the member 1 and the substrate 4 is confirmed, the thus obtained assembly is processed from the X-cut plate 3 to fabricate an optical waveguide element as shown in FIG. 3(a)–FIG. 4(b). FIG. 3(a) is a perspective view schematically showing an optical waveguide element 6, and FIG. 3(b) is an elevational view showing the optical waveguide element 6. FIG. 4(a) is a side view showing the optical waveguide element 6, and FIG. 4(b) is a plan view showing the optical waveguide element 6.

In the optical waveguide element 6, the X-cut plate 3 of the member 1 is wholly removed by mechanical processing (e.g., dicing processing) or laser processing, and the periodically polarized inversion structure 2 and the substrate 4 are partially removed by the same method.

The optical waveguide element 6 has a substrate 7 and an optical waveguide 8 formed on the substrate 7. The substrate 7 has a strip ridge portion 7B at the center of a main surface 7a. Numeral reference 7c designates a side surface of the ridge portion 7b, and numeral reference 7d designates a top surface (joined surface). In FIGS. 3 and 4, the main surface 7a and the side surface 7C are almost vertical, and may be provided so as to be tilted from the depicted vertical surface.

The optical waveguide 8 is formed so as to be contacted with the top surface 7d of the ridge portion 7b. Moreover, the optical waveguide 8 is made of the lithium niobate of which one a axis is almost perpendicular to the main surface 7a of the substrate 7 and of which the other a-axis is elongated along the long direction of the optical waveguide 8. One a-axis of the lithium niobate-lithium tantalate solid solution single crystal to construct the substrate 7 is elongated along the long direction of the optical wavelength 8 as shown in FIGS. 4(a) and 4(b). The c-axis of the solid solution single crystal is tilted for the top surface 7d and the main surface 7a by the angle of θ, and the other a-axis of the solid solution single crystal is lithium niobate-lithium tantalate single crystal is tilted from an axis perpendicular to the top surface 7d by the angle of θ.

In this condition, the thermal expansions of the lithium niobate to construct the optical waveguide 8 and the lithium niobate-lithium tantalate solid solution single crystal to construct the substrate 7 can be almost matched two dimensionally in a wide temperature range.

Figure 5:
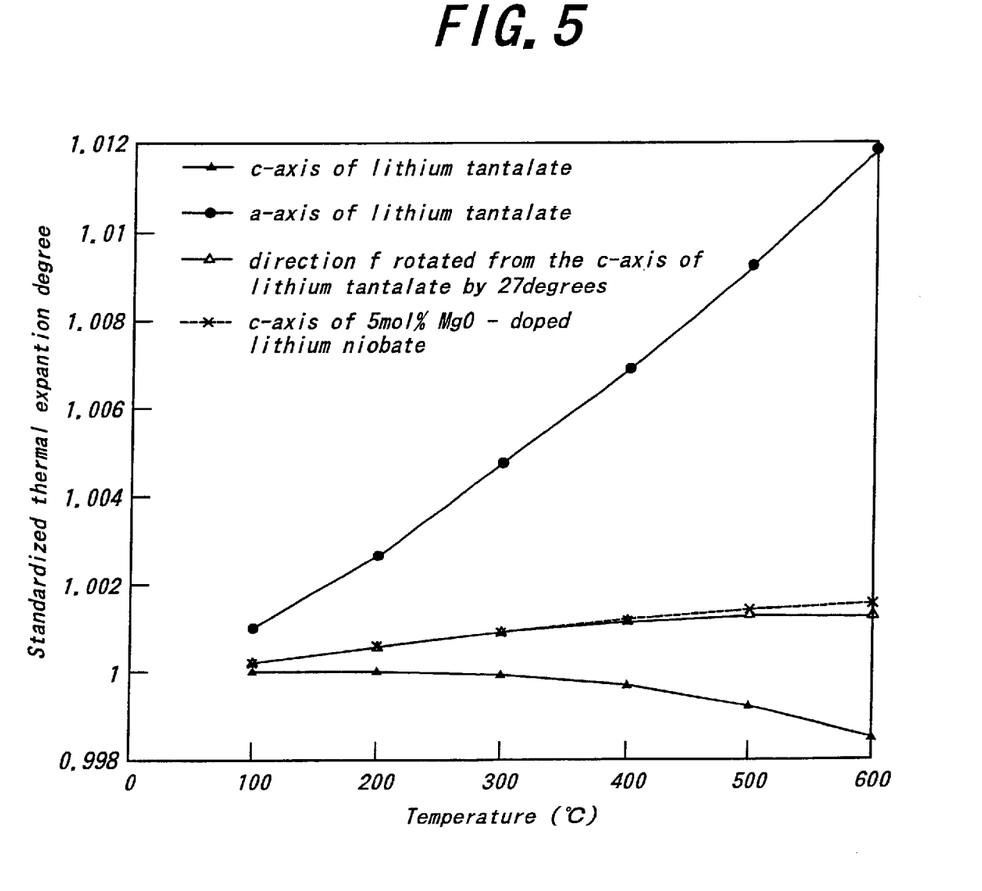
FIG. 5 is a graph showing the relation between the crystal orientation of various single crystals and their standardized thermal expansions.
Figure 6:
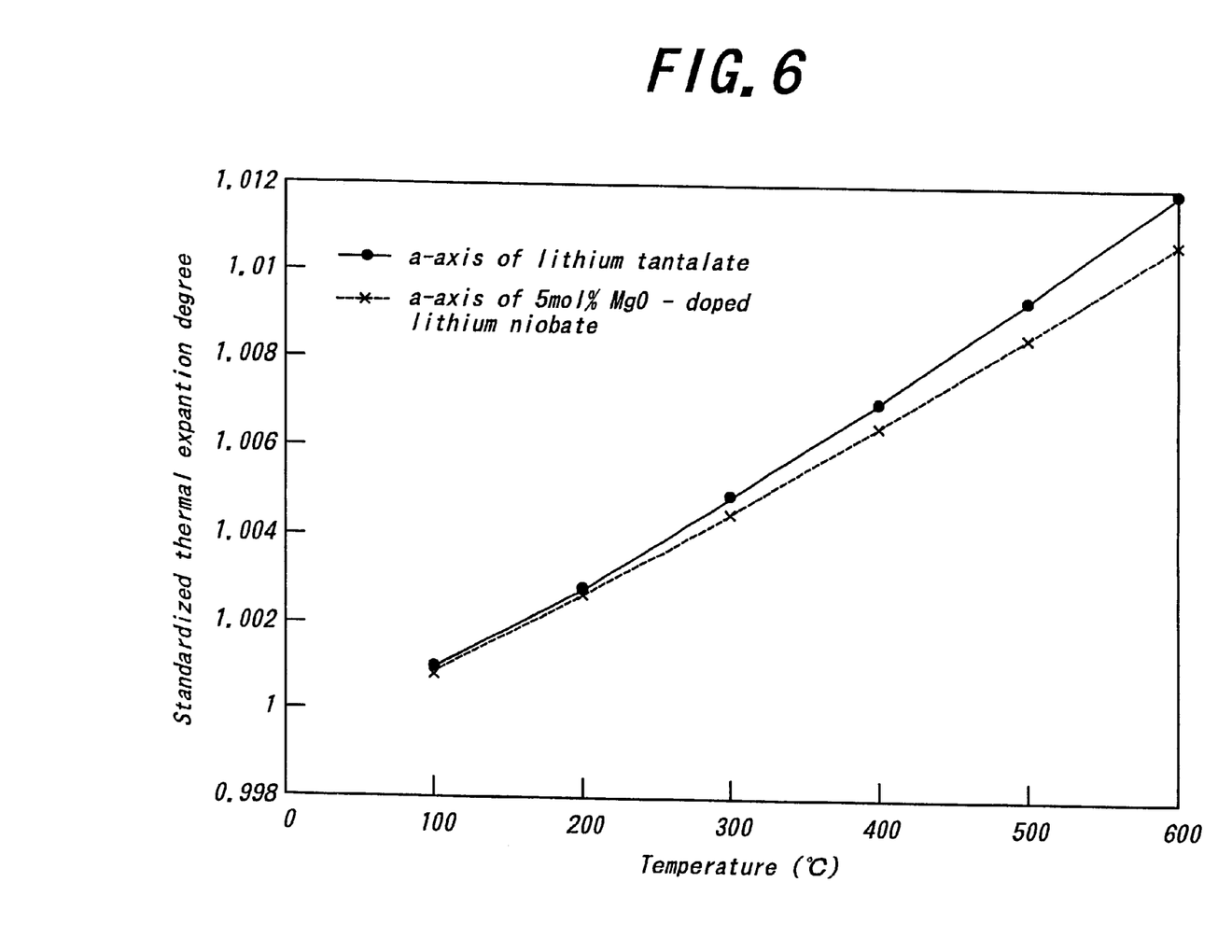
FIG. 6 is a graph showing the standardized thermal expansions of the A axes of a lithium tantalate single crystal and a MgO-doped lithium niobate single crystal.

FIGS. 5 and 6 show graphs of the thermal expansion degrees (thermal expansion degrees standardized by the respective lengths at room temperature being set to "1") of the crystalline orientations of various single crystals. The standardized thermal expansion degree of the c-axis of lithium tantalate single crystal decreases with temperature, and the one of the a-axis of lithium tantalate single crystal much increases with temperature. The standardized thermal expansion degree of the c-axis of 5 mol %. MgO-doped lithium niobate single crystal increases slightly with temperature. Therefore, a remarkable difference in thermal expansion is brought out at the joining boundary of the substrate 7 and the optical waveguide 8.

In this invention, the substrate 7 and the bulky optical waveguide 8 are joined so that the c-axis of the lithium niobate single crystal to construct the optical waveguide 8 is parallel to the direction f tilted from the taxis by the angle of θ of the lithium tantalate single crystal to construct: the substrate 7. As is apparent from FIG. 5, when the tilted angle θ is set to around 27 degrees, the difference in thermal expansion between both of the above single crystals almost disappears. Moreover, although the thermal expansion degrees of the a-axes of the above single crystals increase with temperature, the difference in their thermal expansion degrees is small. As a result, the two-dimensional matching at the joined boundary between the substrate 7 and the bulky optical waveguide 8 can be realized.

Therefore, the angle θ is preferably set to 17–37 degrees, particularly 20–30 degrees, more particularly 26–28 degrees.

Preferably, lithium niobate of 10 mol % or below (preferably 5 mol % or below) may be dissolved in solid into the lithium tantalate single crystal to construct the substrate 7.

Although it is desired that the c-axis of the lithium niobate Single crystal of the optical waveguide 8 is set to be almost parallel to the joined surface of the substrate 7, it is allowable in the present invention that it is tilted from the joined surface, However it is preferable that the tilted angle is set to 7 degrees or below, particularly 5 degrees or below.

The bulky optical waveguide may be formed two-dimensionally, preferably three-dimensionally for optically overlapping the periodically polarized inversion structure 2 effectively. In forming the three-dimensional optical waveguide, the shape or the size of the core cross section is needed to be controlled precisely. The shape of the core cross section largely depends on the refractive indexes of the core itself and the clad. If the refractive index of the clad is changed, the core size is required to be adjusted for realizing the same optical mode in the bulky optical waveguide 8.

As mentioned above, if the substrate 7 is made of the lithium tantalate single crystal, the core shape remains the same regardless of the joining angle of the substrate 7 and the bulky optical waveguide S. That is, since the birefringent index of the lithium tantalate single crystal is much smaller than that of the lithium niobate single crystal, the lithium tantalate single crystal maintains the original refractive index even though the crystalline orientation is rotated.

Figure 7A:
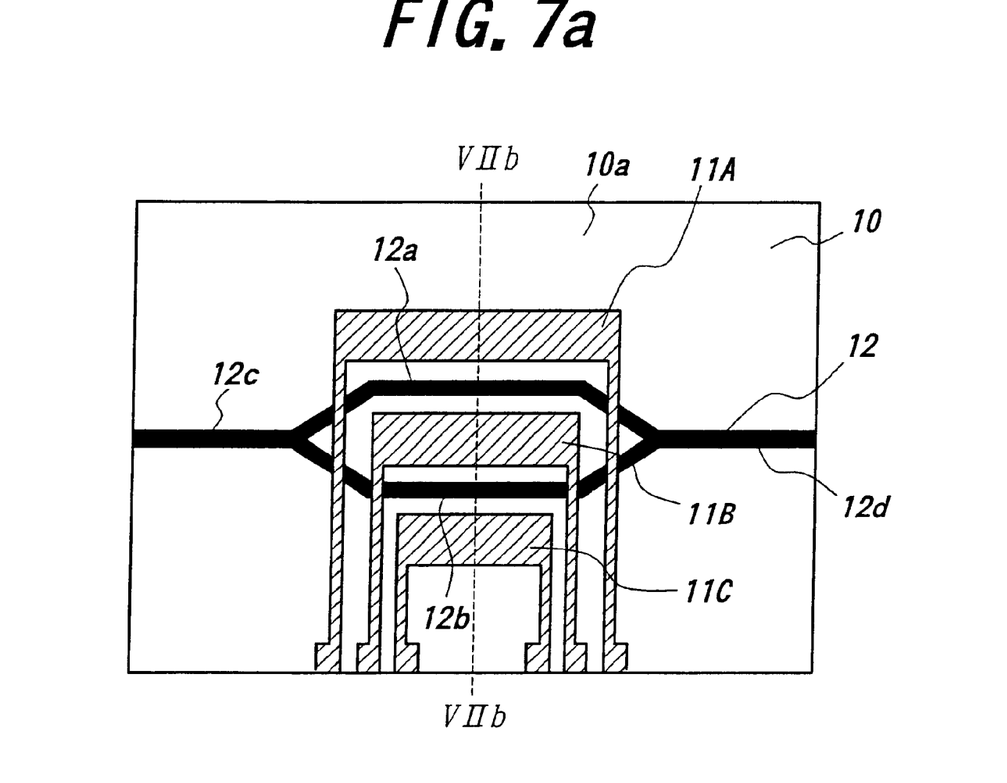
FIG. 7(a) is a plan view schematically showing the structure of a super high speed optical modulator.
Figure 7B:
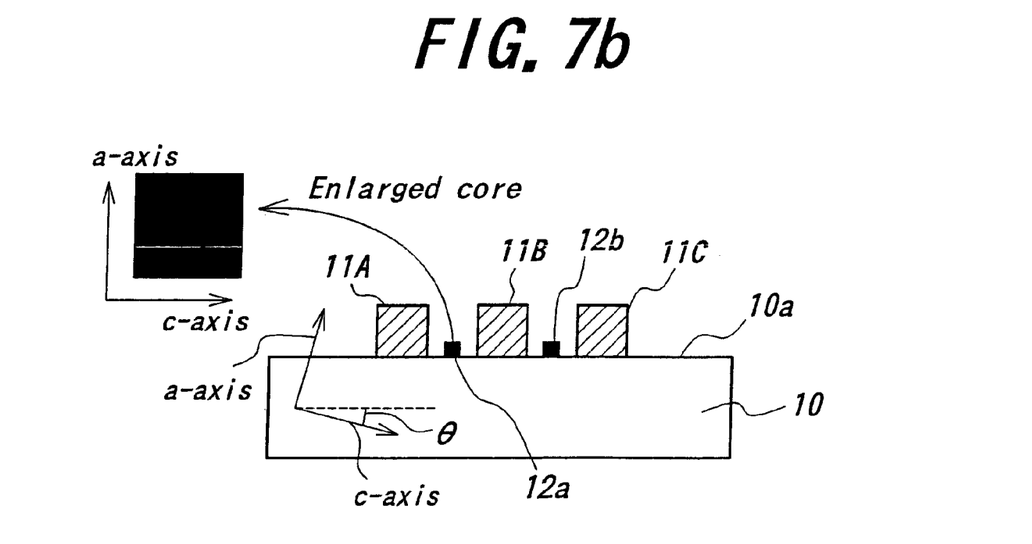
FIG. 7(b) is an elevational view of the super high speed optical modulator of FIG. 7(a)

The above-mentioned optical waveguide element according to the present invention can be applied for a waveguide type super high speed optical modulator for communication or an optical switch. FIG. 7(a) is a plan view schematically showing the structure of a super high speed optical modulator, and FIG. 7(b) is an elevational view of the super high speed optical modulator of FIG. 7(a).

Electrodes for modulation 11A, 11B and 11C are formed in three lines on a joined surface 10a of a substrate 10. Moreover, a Mach-Zehnder optical waveguide 12 is formed on the substrate 10 throughout the long direction thereof. The optical waveguide 12 includes an input part 12C, a pair of branched parts 12a and 12b, and an output part 12d. The optical waveguide 12 is formed by the same manner as the optical waveguide 8, and has the same crystalline orientation as the optical waveguide 8. The substrate 10 has the same crystalline orientation as the substrate 7. The optical waveguide 12 is directly joined with the substrate 10.

EXAMPLE

Such an optical waveguide element as shown in FIGS. 3 and 4 was fabricated, according to the manufacturing steps shown in FIGS. 3 and 4. Concretely, first of all, a 5 mol %. MgO-doped lithium niobate substrate 3 offcut by three degrees from the z-axis(87 degrees-Z cut), having a length of 30 mm, a width of 30 mm and a thickness of 1 mm, was prepared. Then, a periodically polarized inversion structure 2 was formed in a period of 3.2 $\mu$m and a depth of 2 $\mu$m in the substrate 3 by a voltage applying method. The thus obtained inversion pattern was elongated along the polarizing direction of the substrate 3. Moreover, since the substrate was offcut from the z-axis by three degrees, the inversion pattern was tilted by three degrees into the interior of the substrate from the surface thereof.

Moreover, a substrate 4 was made, in a length of 30 mm, a width of 30 mm and a thickness of 1 mm, of lithium tantalate single crystal. The tilted angle was set to 27 degrees.

Subsequently, the surfaces to be joined of the substrates 3 and 4 were washed by an organic solvent, and cleaned by acidic treatment and oxide plasma-treatment.

Then, the substrates 3 and 4 were joined with a jig 5 under it load of 2 kgf/cm$^2$ being applied, and thermally treated at 500° C. under an oxygen atmosphere for an hour and cooled down up to room temperature. Then, the thus obtained assembly was detached from the jig 5, and processed by dicing to fabricate such an optical waveguide element as shown in FIG. 3.

Figure 8:
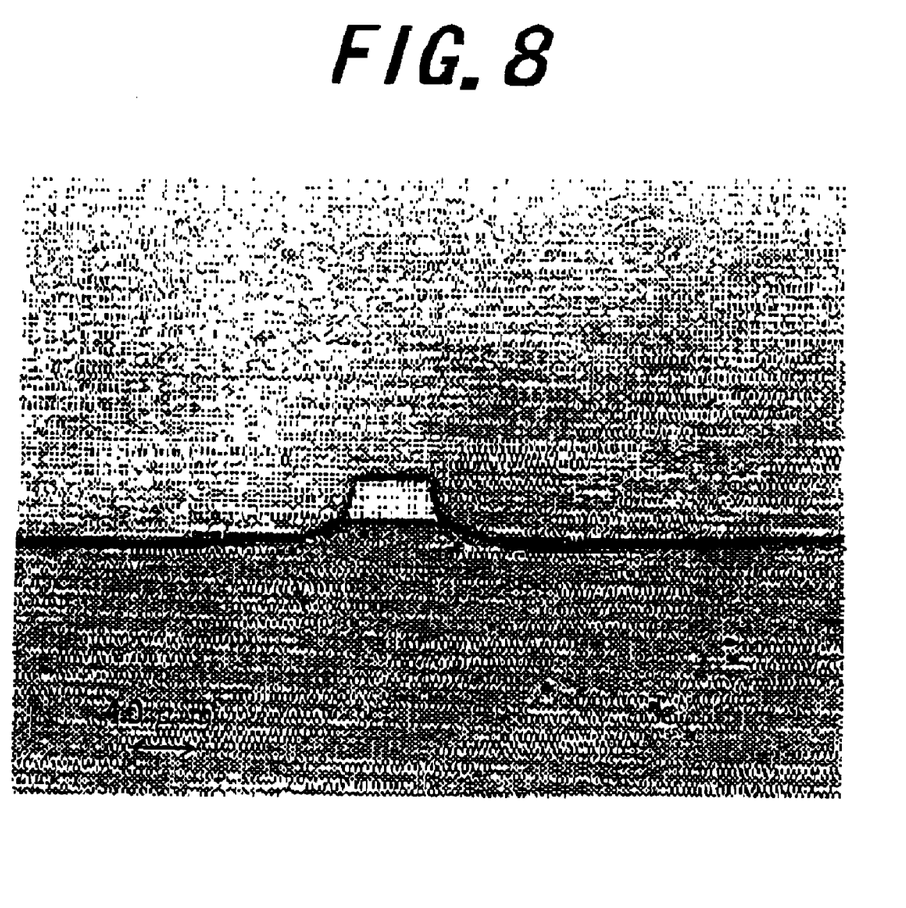
FIG. 8 is a microscope photograph of a ridge structure-type optical waveguide formed in Example.

In this case, the height m of the ridge portion 7c was set to 1 $\mu$m, and the height n of the optical waveguide 8 was set to 2 $\mu$m, and the width p of the ridge portion 7c was set to 3 $\mu$m. A resin-bonded diamond grinding stone (product name:SD6000, the outer diameter: about 52 mm, the thickness: 0.1 mm) was employed as the dicing blade. The rotation number of the dicing blade was set to 30,000 rpm, and the feeding rate was set to 1.0 mm/sec. Thereafter, both ends of the assembly was cut out to fabricate the ridge structure-type optical waveguide element 6 having a size of 10 mm. Then, both ends of the optical waveguide element 6 were chemical-mechanical polished. FIG. 8 is a micro scope photograph (×1500 scale) of the thus obtained ridge structure-type optical waveguide after polishing.

A given optical wave was introduced into the optical waveguide element from a titanium-sapphire laser to generate a second harmonic wave. The phrase matching wavelength was 850 nm, and the wavelength of the thus obtained second harmonic wave was 425 nm. Moreover, the output power of the second harmonic wave was 30 mW at the input power of 100 mW of the introduced fundamental wave. And, the second harmonic wave was not degraded due to the optical damage, etc. Moreover, it was turned out that a stress did not occur due to the difference in thermal expansion between the bulky optical waveguide and the substrate directly joined, and the d constant was not remarkably deteriorated in the bulky optical waveguide due to a stress at the boundary between the bulky optical waveguide and the substrate.

Although the present invention was described in detail with reference to the above examples, this invention is not limited to the above disclosure and variations and modifications may be made without departing from the spirit and scope of the present invention.

According to the present invention, the d constant in an optical waveguide element made of a substrate and a bulky optical waveguide can be developed, while maintaining large optical damage-resistance due to the good crystallinity of the bulky optical waveguide.

What is claimed is:

1. An optical waveguide element comprising a substrate made of a lithium tantalate single crystal or a lithium niobate-lithium tantalate solid solution single crystal and a bulky optical waveguide made of a lithium niobate single crystal directly joined to the substrate, wherein the c-axis of the single crystal comprising the substrate is tilted at an angle with respect to the surface of the substrate to which the bulky optical waveguide is joined.

2. An optical waveguide element as defined in claim 1, wherein the tilted angle of the c-axis of the single crystal comprising the substrate is within a range of 17–37 degrees.

3. An optical waveguide element as defined in claim 1, wherein the c-axis of the lithium niobate single crystal comprising the bulky optical waveguide is tilted at an angle with respect to the surface of the substrate to which the bulky optical waveguide is joined by not more than 7 degrees.

4. An optical waveguide element as defined in claim 3, wherein the c-axis of the lithium niobate single crystal comprising the bulky optical waveguide is parallel with respect to the surface of the substrate to which the bulky optical waveguide is joined.

5. An optical waveguide element as defined in claim 1, wherein the bulky optical waveguide is a three-dimensional optical waveguide.

6. An optical waveguide element as defined in claim 1, wherein a periodically polarized inversion structure is formed at least in the bulky optical waveguide to fabricate a higher harmonic wave-generating element.

7. An optical waveguide element as defined in claim 6, wherein a higher harmonic wave having a wavelength of 330–550 nm is oscillated from the bulky optical waveguide.

8. An optical waveguide element as defined in claim 6, wherein the substrate has a ridge portion on a main surface thereof, and the bulky optical waveguide is directly joined with the top surface of the ridge portion.

9. An optical waveguide element as defined in claim 1, wherein the lithium niobate-lithium tantalate solid solution single crystal comprising The substrate includes not more than 10 mol % of lithium niobate.

10. An optical waveguide element as defined in claim 1, wherein at least one element selected from the group consisting of Mg, Zn, Sc and In is doped in the lithium niobate comprising the bulky optical waveguide.

* * * * *